Patented Sept. 28, 1954

2,690,449

UNITED STATES PATENT OFFICE 2,690,449

HYDROCARBON SYNTHESIS AND CATALYST THEREFOR

Claude W. Watson, Port Arthur, Tex., assignor to The Texas Company, New York, N. Y., a corporation of Delaware No Drawing. Original application October 30, 1947, Serial No. 783,064. Divided and this application December 9, 1950, Serial No. 199,955

12 Claims. (Cl. 260—449.6)

The present invention relates to the synthesis of hydrocarbons, oxygenated hydrocarbons and the like by the catalytic reduction of carbon oxide with hydrogen, and is more specifically concerned with conducting said reaction through the agency of an active catalyst effective to yield high conversions of reactive feed material into normally liquid hydrocarbons without undesirable catalyst disintegration.

The present application is a division of my prior application Serial No. 783,064, filed October 30, 1947, and issued November 4, 1952, as U. S. Patent No. 2,616,915.

In accordance with the present invention, the synthesis of desired liquid products of reaction is effected in the presence of a fluidized, iron-containing catalyst possessing high resistance to subdivision resulting from the chemical action of the gases and vapors with which it comes in contact in the reaction zone. To this end, the catalyst is composed of its intimately associated components physically bonded into solid particles of proper size for fluidization under the reaction conditions prevailing in the synthesis operation, the components thereof maintaining their physical integrity under reaction conditions at which high yields of predominantly liquid, desired products of reaction are realized.

The invention is particularly applicable to hydrocarbon synthesis operations wherein the active catalytic component comprises iron and iron-containing compounds effective at temperatures within the range of about 550 to 700° F., for example, and preferably under superatmospheric pressure, as for example, 150 to 300 p. s. i.

In the synthesis of hydrocarbons, the extent of conversion of the reactant feed, expressed, for example, as the percentage conversion of the feed carbon monoxide into desired products containing not less than three carbon atoms in the molecule, has been in the past relatively low. At first, this was primarily due to the difficulty of removing the exothermic heat at a rate at which the necessary narrow optimum range of operating temperature can be sustained. With the advent of the fluid catalyst technique, temperature control was improved to the extent where the extent of reaction could be materially improved. Thus the catalyst, in a state of dense phase fluidization, may be held substantially at a predetermined temperature level by provision of adequate cooling surfaces in contact therewith. So also, by adjusting the reaction conditions and particularly the composition of total feed to the reactor, and by selection of active catalysts, a substantial approach to theoretical yield was made available.

In particular, a material improvement in the degree of conversion to $C_3$ and higher hydrocarbons may be realized by recycling normally gaseous products of reaction or selected components thereof. One such method, disclosed in my copending application Serial No. 630,521, filed November 23, 1945, now U. S. Patent No. 2,585,981, contemplates maintenance of a relatively high carbon dioxide recycle which suppresses net carbon dioxide formation and induces high yields of desired liquid hydrocarbons with ultimate disposal of the oxygen largely as water.

However, during extended operation under conditions of high conversion, the usual initially reduced catalyst progressively tends to disintegrate or spall into progressively finer particles. As conversion increases above about 70 percent on the basis of the carbon monoxide converted into desired liquid products containing at least three carbon atoms, there is a corresponding tendency toward catalyst disintegration, which causes reduction in density of the fluid catalyst bed and lessened turbulence. These result in decrease in the heat transfer rate desirable for good heat control. More significant, however, is the fact that the finely divided particles of spalled catalyst are carried out of the reaction zone as fines, requiring the addition of fresh catalyst makeup at an uneconomical rate. In short, under conditions of high yield of desired products, the catalyst becomes subdivided to a condition where it can no longer be effectively maintained in dense fluid phase in the reaction zone.

The present invention overcomes this effect by providing a catalyst which is adapted to conform with equilibrium catalyst chemical composition without physical degeneration and thus may be subjected to continuous use under conditions required for maximum yields without excessive subdivision. To this end, the catalyst is composed of physically bonded, integral solid particles of suitable physical hardness and strength and of proper size for fluidization, comprising a major proportion of $Fe_3O_4$ and a minor proportion of the iron percarbide, $Fe_2C_n$, in which $n$ is at least 20 and may be in the range of about 20 to 100.

Preferably, the catalyst comprises $Fe_3O_4$ in substantial excess over the percarbide, advantageously above about 90 to 95 percent, on the basis of a mixture of the two. In fact, it has been found that in the usual situation where high degrees of conversion to $C_3$ and higher are realized, that is to say, for example, above 90% (on the basis of CO consumed), only small quantities of the iron percarbide may be sufficient, amounting to as little as 1% or less. Satisfactory results are achieved at very high conversions where this ingredient comprises less than 0.1% of the mixture. However, within the range disclosed, the relative proportioning of the Fe₃O₄ and percarbide does not critically affect the physical stability of the catalyst. Therefore, it is usually preferable to combine the ingredients in convenient proportions, as for example, 90% by weight of Fe₃O₄ and 10% of percarbide.

Accordingly, the present invention contemplates formation of the catalyst particles by physically bonding an intimate admixture of the foregoing ingredients into suitably sized particles. The intimate admixture of active ingredients is prepared by intimately associating separately prepared Fe₃O₄ and percarbide. When bonded into particles capable of fluidization under reaction conditions, they exhibit a marked compatibility with the reactants such that chemical subdivision is prevented. The Fe₃O₄ may be derived from any conventional source which delivers a product free from any material contamination by undesired constituents capable of impairing the process.

The percarbide may be readily prepared by carbiding finely divided iron with any suitable carbiding agent, such for example, as carbon monoxide or carbon dioxide. Advantageously, this step is carried out simply by passing carbon monoxide through a fluidized iron powder at any suitable elevated temperature, as for example, a temperature in the range of synthesis temperatures mentioned above, and preferably less than the temperature of the operation in which the catalyst is to be used, until the required degree of carbiding has taken place.

Physical bonding of the catalytic ingredients into particles of the indicated composition may be effected by cementing, sintering, or otherwise agglomerating an intimately associated mixture thereof by any suitable means, thereafter comminuting or subdividing the agglomerated mass, and then grading to the required mesh size. Alternatively, the mixture may be directly bonded into particles of the required size, as for example, by pelleting.

In any event, it is desirable that the Fe₃O₄ and iron percarbide be as intimately associated as possible; and, therefore, these ingredients are advantageously subjected to complete admixing in as finely divided form as feasible, preferably in a state of subdivision less than 400 mesh, and in the form of an impalpable powder.

Agglomeration of the mixed powder into a solid mass may be easily effected through the agency of a suitable refractory cement, such, for example, as any of the typical calcium aluminate hydraulic cements. Any other cementing material substantially free from substantial impairing effect upon the synthesis reaction and resistant to the temperatures employed may, however, be substituted. Silicates such as zirconium silicate provide a somewhat less effective binding agent.

Alternatively, integration of the powder may be accomplished by baking at an elevated temperature, preferably after compacting or agglomerating it with an adherent material such as asphalt dissolved in naphtha. It will be understood that compacting is followed by drying and baking, preferably under a vacuum or under a neutral atmosphere and at temperatures such that the mass possesses the necessary hardness and strength. Similarly, in the preparation of a fired, sintered or calcined product, the asphalt binder may be substituted by an aqueous suspension or slurry of a refractory material such as zirconia or magnesia, produced by prolonged grinding in a ball mill or the like. It will be understood that the slurry is admixed with the powder just in sufficient proportion to permit ready compacting or ramming into a highly compacted mass suitable for drying and firing.

The final integrated composition may be sized and graded by a combination of grinding followed by screening or any other conventional separation. The product thereby produced possesses a physical strength and resistance to abrasion dependent upon the method of integration employed. Where the aforementioned calcium aluminate cement is employed in a typically effective proportion such as one volume of cement for each four volumes of catalyst powder, thereafter permitted to set and then dried, the resulting composition possesses physical resistance to abrasion ideal for fluid catalytic conversion processes, and moreover, is not subject to subdivision by chemical attack in the reaction zone.

The specific size of the ultimate particles prepared will vary somewhat, depending upon the specific reaction conditions and particularly the rate of gas flow which will be encountered. Normally, however, the particle size will range between about 60 and 400 mesh, usually finer than about 100 mesh and larger than about 325 mesh.

In use, the catalyst is disposed within a reaction zone as a dense phase fluid mass contacting adequate cooling surfaces supplied internally with a coolant such as water maintained at appropriate temperature. The upflow of gaseous reactants may be relied upon to maintain the particles in a uniform state of dense fluidization, although mechanical adjuncts may be also employed. As above indicated, the reaction zone is held under reaction conditions, as for example, at a temperature of about 600° F. and elevated pressure. The effluent from the reactor is withdrawn from contact with the catalyst at the upper portion of the reaction zone and subjected to condensation and separation of the normally liquid constituents, after which the normally gaseous constituents are recycled as desired to the reaction zone inlet.

As intimated above, the surprising resistance of the present catalyst to spalling during prolonged operation is believed to result from the fact that its composition is unsusceptible to the disintegrative chemical change which the usual catalysts normally tend to undergo during operation. In this respect, it is to be particularly contrasted with the commonly proposed method of catalyst preparation wherein an iron compound is reduced to metallic iron and may be subjected to a conditioning or carbiding treatment, and thereafter undergoes subdivision in a progressive process involving chemical action analogous to surface rusting of iron or steel exposed to the atmosphere.

In accordance with the present invention, however, the composition comprises iron oxide in essentially equilibrium form and the iron percarbide in a form physically compatible with the equilibrium conditions. The physical compatibility of the percarbide is believed to follow from the fact that the iron percarbide contains a substantial proportion of carbon above final equilibrium limits, and moreover, may adjust itself to such equilibrium without adverse physical effect. In short, decarbiding to a degree effective to conform with a condition of carbide equilibrium in the reaction zone may occur without material loss of physical properties, whereas the reverse would not be true.

The foregoing statement of theory is understood to be presented solely to facilitate comprehension of the invention, and not by way of limitation.

It is particularly important to note that separation of the fines occurs readily from fluid catalyst beds at reactant flow rates usually proposed. Thus, in a typical case, fine powder less than about 400 mesh formed by chemical alteration of an ordinary reduced iron catalyst becomes promptly entrained in the effluent product stream and may be readily separated outside the reaction zone. While the particle size of the separated solids may vary somewhat depending on reaction conditions and particularly the velocity of gas flow in the reactor, such entrainment in any event affords a separation of particles too fine for effective dense phase fluidization, thus automatically retaining within the reaction zone a catalyst mass effective for contacting the reactants in the desired dense phase state. So also, the particle size of the dense phase within the reaction zone affords a suitable measure or approximation of the particle size range to which the physically bonded prepared catalytic particle should be graded for fluidization. In general, therefore, the prepared particles will be in range of coarser than about 400 mesh, with an appropriate increase in size as gas velocities increase. Likewise, as indicated above, the maximum size which determines the other limit of the particle size range, is that which can be caused to become a part of the turbulent fluid phase, by the gas flow or other fluidizing influences encountered in operation.

In accordance with one specific example of the present invention, a catalyst is prepared by thoroughly and completely mixing $Fe_3O_4$ in the form of a finely ground, impalpable powder with a so-called iron percarbide produced by treating fluidized, finely powdered iron in an atmosphere of carbon monoxide at a temperature of 600° F. and a pressure of 200 p. s. i. until withdrawn samples indicate a composition of substantially $Fe_2C_{100}$. The mixture contains about 95% by weight of $Fe_3O_4$ and about 5% by weight of the carbide. The mixture is impregnated with a solution containing about 1% of potassium hydroxide on the basis of the weight of the mixed powders. The $Fe_3O_4$ contains about 2% alumina ($Al_2O_3$). The resulting mix is further mixed with about 25% by weight of calcium aluminate refractory cement and sufficient water to form a mortar and the entire mix permitted to set. After setting, the resulting concrete mass is thoroughly dried and then ground and graded to a mesh size of approximately 150 to 300.

The resulting catalyst particles are placed in a synthesis reactor and subjected to upflow of the fresh feed reactant gas comprising essentially hydrogen and carbon monoxide gas in the molar ratio of 2:1. The fresh feed gas is supplemented by a recycle of the normally gaseous products of reaction in a proportion equal to about 2.5 times the rate at which the fresh feed gas is supplied on a standard volume basis. Temperature is maintained at about 625° F. and pressure at about 200 pounds p. s. i. The internal upflow of total feed gas in the lower portion of the reactor, neglecting the volume occupied by the catalyst particles, amounts to approximately two feet per second whereby the catalyst is maintained in a dense phase of fluidization.

The gasiform reaction products are withdrawn from the upper pseudo-liquid surface of the catalyst, condensed to 70° F., and the liquid constituents separated from residual gases. The residual, normally gaseous stream in excess of the recycle stream is vented. Under the foregoing conditions, the net conversion of carbon monoxide to desired liquid products amounts to about 95% on the basis of the net carbon monoxide supplied the fresh feed gas, being hydrocarbons heavier than $C_3$'s. Of great significance, however, is the fact that after operation for several hundred hours, the catalyst bed density remains substantially constant with immaterial loss of fines.

It is contemplated, as intimated in the above example, that the present catalyst may contain any of the conventional activating or promoting agents such as the oxides of the alkali or alkaline earth metals, titania, zirconia, alumina and many others which are usually employed in minor portions as, for example, from 0.5 to 5%. I prefer, however, to include potassium oxide ($K_2O$), usually in the range of about 0.5 to 1.5%, and alumina, usually in the range of about 1.5 to 5%. The potassia, or the other ingredients, may be incorporated in any convenient manner as indicated above.

In practicing the present invention, provision is advantageously made for effecting contact between reactants and the catalyst for a contact time and under conditions of good turbulence where the reactants effectively scrub the surface of the catalyst. To this end, relatively deep catalyst beds are to be preferred and high linear velocity of gas flow, above 1.5, preferably above about two feet per second, in an upward direction is best. Thus, stagnation of the gaseous film on the catalyst surface is avoided, with better overall yields. As shown above, however, the rate of gas flow fixes the necessary range of catalyst particle size necessary to attain good dense phase fluidization with characteristic high catalyst turbulence or vibration, efficient surface contact, and high rates of heat transfer.

The present invention, while broadly applicable to any typical synthesis gas, particularly contemplates the use of a fresh reactant feed containing carbon monoxide and hydrogen in a proportion which approximates that required for exclusive reaction with the production of olefins and water. Where the feed is essentially hydrogen and carbon monoxide the preferred proportions are therefore, about 2:1, that is, in the range of about 1.5:1 to 2.5:1. However, since, as shown above, high yields of desired liquid products result when substantial proportions of carbon monoxide are included in the feed to the reaction zone, the fresh feed as well as the recycle stream may include substantial proportions of carbon dioxide for consumption in the product of the liquid hydrocarbons.

It is to be noted that the terms "normally liquid hydrocarbons" or "desired products of reaction" are intended to include, in general, hydrocarbons containing at least three carbon atoms, and incidental oxygenated hydrocarbons which are liquid under normal conditions, notwithstanding that the lower molecular constituents of this group may be liquid only as absorbed in higher hydrocarbons, or as subsequently subjected to polymerization or the like.

The term, iron percarbide of the composition corresponding to $Fe_2C_n$ where $n$ is greater than about 20, as used herein, means specifically the product formed by carbiding iron to such an extent that the product has the composition indicated. Such carbiding may be effected by any of the numerous methods previously disclosed in the specification as, for example, by contact with carbon monoxide at elevated temperature. However, as also disclosed, the carbiding may be effected by any equivalent carbiding agent capable of adding carbon to the iron.

While the foregoing invention has been described more specifically in connection with certain preferred embodiments, it is to be understood that these are by way of illustration and not by way of limitation; and the invention should not be limited thereto, except as determined by the scope of the following claims.

I claim:

1. The method of preparing a solid particle catalyst of a range of particle size effective for fluidization in contact with an upflowing stream of synthesis gas comprising hydrogen and carbon monoxide, for the production of liquid hydrocarbons, oxygenated hydrocarbons and mixtures thereof, which comprises intimately admixing a major proportion of $Fe_3O_4$ with a minor proportion of an iron percarbide having a composition corresponding to $Fe_2C_n$, where $n$ is greater than about 20, and physically bonding the intimately associated mixture without effecting any substantial chemical change in the said constituents into physically abrasion-resistant particles within the said range of size effective for fluidization.

2. The method according to claim 1 wherein the intimately associated mixture of $Fe_3O_4$ and iron percarbide comprises at least 95 per cent $Fe_3O_4$.

3. The method according to claim 1 wherein the physically bonded, abrasion-resistant particles are within a size range of from about 60 to 400 mesh.

4. The method according to claim 1 wherein the said abrasion-resistant particles comprise masses of said intimately associated mixture of fine powder physically bonded by an added cementitious material stable at temperatures within the range of 550–700° F.

5. The method according to claim 1 wherein the said abrasion-resistant particles comprise masses of said intimately associated mixture of fine powder physically bonded by a calcium aluminate hydraulic cement.

6. The method according to claim 1 wherein the intimately associated mixture of $Fe_3O_4$ and iron percarbide comprises at least about 90 per cent $Fe_3O_4$.

7. The method of preparing a solid particle catalyst of a range of particle size effective for fluidization in contact with an upflowing stream of synthesis gas comprising hydrogen and carbon monoxide, for the production of liquid hydrocarbons, oxygenated hydrocarbons and mixtures thereof, which comprises providing in the form of a powder substantially finer than the said range of particle size, an intimately associated mixture comprising a major proportion of $Fe_3O_4$ and a minor proportion of an iron percarbide of the composition corresponding to $Fe_2C_n$ where $n$ is greater than about 20, and physically bonding the intimately associated mixture without effecting any substantial chemical change in the said constituents into abrasion-resistant particles within the said size range effective for fluidization.

8. A solid particle catalyst of a range of particle size effective for fluidization in contact with an up-flowing stream of synthesis gas comprising hydrogen and carbon monoxide, for the production of liquid hydrocarbons, oxygenated hydrocarbons and mixtures thereof, each of said catalyst particles comprising a mass of intimately associated, powdered mixture comprising a major proportion of $Fe_3O_4$ and a minor proportion of iron percarbide having a composition corresponding to $Fe_2C_n$ where $n$ is greater than about 20, physically bonded to form an integrated unit within said size range effective for fluidization.

9. A catalyst according to claim 8 wherein the said physically bonded abrasion-resistant particles are essentially within the size range of from about 60 to 400 mesh.

10. In the synthesis of hydrocarbons, oxygenated hydrocarbons, and mixtures thereof wherein a stream of synthesis gas comprising hydrogen and carbon monoxide is caused to flow upwardly through a dense fluid phase mass of solid particle hydrocarbon synthesis catalyst in a range of particle size effective for fluidization, the improvement which comprises effecting said reaction in the presence of a solid particle catalyst formed by intimately admixing a major proportion of $Fe_3O_4$ with a minor proportion of an iron percarbide having a composition corresponding to $Fe_2C_n$, where $n$ is greater than about 20 and physically bonding said intimately admixed constituents without effecting any substantial change in the chemical composition of said constituents into physically abrasion-resistant particles within the said range of size effective for fluidization.

11. The method according to claim 10 wherein said intimate admixture of $Fe_3O_4$ and iron percarbide comprises at least 95% $Fe_3O_4$.

12. The method according to claim 10 wherein said particles comprise masses of said admixture physically bonded by an added cementitious material.

References Cited in the file of this patent

UNITED STATES PATENTS

| Number | Name | Date |
|---|---|---|
| 2,038,566 | Huettner et al. | Apr. 28, 1936 |
| 2,337,684 | Scheineman | Dec. 28, 1943 |
| 2,369,548 | Elian | Feb. 13, 1945 |
| 2,406,851 | Redcay | Sept. 3, 1946 |
| 2,436,962 | Gaucher | Mar. 2, 1948 |
| 2,467,803 | Herbst | Apr. 19, 1949 |
| 2,479,420 | Segura | Aug. 16, 1949 |
| 2,481,841 | Hemminger | Sept. 13, 1949 |
| 2,483,850 | Segura et al. | Oct. 4, 1949 |
| 2,510,823 | Krebs | June 6, 1950 |
| 2,540,599 | Segura | Feb. 6, 1951 |

OTHER REFERENCES

Haensel, "Kaiser Wilhelm Institut Fur Kohlenforschung, Mulheim," Rept. No. 284, page 4 (January 11, 1946).